(12) United States Patent
Bouyer et al.

(10) Patent No.: US 8,373,112 B2
(45) Date of Patent: Feb. 12, 2013

(54) COLD ATOM INTERFEROMETRY SENSOR

(75) Inventors: Philippe Bouyer, Bures-sur-Yvette (FR); Arnaud Landragin, Orsay (FR)

(73) Assignees: CNRS, Paris (FR); Observatoire de Paris, Paris (FR)

( * ) Notice: Subject to any disclaimer, the term of this patent is extended or adjusted under 35 U.S.C. 154(b) by 235 days.

(21) Appl. No.: 12/921,519

(22) PCT Filed: Mar. 11, 2009

(86) PCT No.: PCT/FR2009/000252
§ 371 (c)(1),
(2), (4) Date: Dec. 6, 2010

(87) PCT Pub. No.: WO2009/118488
PCT Pub. Date: Oct. 1, 2009

(65) Prior Publication Data
US 2011/0073753 A1  Mar. 31, 2011

(30) Foreign Application Priority Data
Mar. 12, 2008 (FR) ...................................... 08 51599

(51) Int. Cl.
*H01S 3/00* (2006.01)
(52) U.S. Cl. ......... 250/251; 356/450; 356/451; 356/484
(58) Field of Classification Search .................. 250/251; 356/450, 451, 484
See application file for complete search history.

(56) References Cited

U.S. PATENT DOCUMENTS

| 5,233,462 | A | 8/1993 | Wong |
| 5,274,231 | A | 12/1993 | Chu et al. |
| 5,274,232 | A | 12/1993 | Chu et al. |
| 5,338,930 | A | 8/1994 | Chu et al. |
| 5,528,028 | A | 6/1996 | Chu et al. |
| 6,303,928 | B1 | 10/2001 | Buell et al. |
| 6,314,809 | B1 | 11/2001 | Kasevich et al. |

(Continued)

FOREIGN PATENT DOCUMENTS

| CN | 1333622 A | 1/2002 |
| CN | 1603984 A | 4/2005 |

(Continued)

OTHER PUBLICATIONS

Lim, Sang-Hyun et al.; "Single-Pulse Phase-Control Interferometric Coherent Anti-Stokes Raman Scattering Spectroscopy;" Physical Review A 72, 2005; pp. 041803-1-041803-4.

(Continued)

*Primary Examiner* — Michael Maskell
*Assistant Examiner* — Hanway Chang
(74) *Attorney, Agent, or Firm* — Osha Liang LLP

(57) ABSTRACT

The disclosure relates to a cold atom interferometry sensor that includes: a source of atoms; a dual-frequency laser capable of generating a first Raman dual-frequency laser beam; a reflector arranged so as to reflect the first Raman dual-frequency laser beam in order to generate a second Raman dual-frequency laser beam, the first laser beam and the second laser beam propagating in different directions in order to obtain atomic interference fringes from the emission of cold atoms obtained from the atom source; characterized in that the reflector is further arranged so as to enable multiple reflections of the first beam on surfaces of the reflector, so that the first beam and the multiple reflections thereof allow the capture of atoms from the atom source in order to obtain the cold atoms.

20 Claims, 6 Drawing Sheets

U.S. PATENT DOCUMENTS

| | | |
|---|---|---|
| 6,548,809 B2 | 4/2003 | Bouyer et al. |
| 6,635,867 B2 | 10/2003 | Kajita |
| 7,126,112 B2 | 10/2006 | Anderson et al. |
| 7,142,983 B2 | 11/2006 | Huddle |
| 7,317,184 B2 | 1/2008 | Kasevich et al. |
| 7,323,941 B1 | 1/2008 | Happer et al. |
| 7,359,059 B2 | 4/2008 | Lust et al. |
| 7,439,814 B2 | 10/2008 | Happer et al. |
| 7,915,577 B2 | 3/2011 | Fatemi et al. |
| 7,944,317 B2 | 5/2011 | Strabley et al. |
| 7,954,375 B2 | 6/2011 | Zaugg |
| 7,965,147 B2 | 6/2011 | Strabley et al. |
| 7,978,334 B2 | 7/2011 | Schwartz et al. |
| 2005/0027489 A1 | 2/2005 | Kasevich et al. |
| 2008/0170218 A1 | 7/2008 | Dantus et al. |
| 2009/0242743 A1 | 10/2009 | Bouyer et al. |
| 2010/0064767 A1 | 3/2010 | Rice et al. |
| 2010/0147071 A1 | 6/2010 | Schwartz et al. |
| 2010/0200739 A1 | 8/2010 | Anderson et al. |
| 2010/0320995 A1 | 12/2010 | David et al. |

FOREIGN PATENT DOCUMENTS

| | | |
|---|---|---|
| CN | 1658095 A | 8/2005 |
| CN | 2757187 Y | 2/2006 |
| CN | 1784109 A | 6/2006 |
| CN | 1967145 A | 5/2007 |
| CN | 1333622 C | 8/2007 |
| CN | 200950173 Y | 9/2007 |
| CN | 201016734 Y | 2/2008 |
| CN | 100376123 C | 3/2008 |
| CN | 201118551 Y | 9/2008 |
| CN | 101425804 A | 5/2009 |
| CN | 100538269 C | 9/2009 |
| CN | 100589049 C | 2/2010 |
| EP | 1896796 A1 | 3/2008 |
| EP | 2154586 A2 | 2/2010 |
| FR | 2 826 446 | 12/2002 |
| FR | 2 848 296 | 6/2004 |
| FR | 2 877 430 | 5/2006 |
| JP | 2010-103483 A | 5/2010 |

OTHER PUBLICATIONS

Lee, K.I. et al.; "Single-Beam Atom Trap in a Pyramidal and Conical Hollow Mirror;" Optics Letters, OSA, vol. 21, No. 15, XP000622112, Aug. 1, 1996; pp. 1177-1179.

McGuirk, J.M. et al.; "Sensitive Absolute-Gravity Gradiometry Using Atom Interferometry;" Physical Review A, vol. 65, XP002500113, Feb. 8, 2002; pp. 033608-1-033608-14.

Yu, N. et al.; "Development of an Atom-Interferometer Gravity Gradiometer for Gravity Measurement From Space;" Applied Physics B, Lasers and Optics, vol. 84, No. 4, XP019424639, Jul. 18, 2006; pp. 647-652.

COLD ATOM INTERFEROMETRY SENSOR

CROSS-REFERENCE TO RELATED APPLICATIONS

This application is a National Phase Entry of International Application No. PCT/FR2009/000252, filed on Mar. 11, 2009, which claims priority to French Application 08/51599, filed on Mar. 12, 2008, both of which are incorporated by reference herein.

BACKGROUND AND SUMMARY

The invention relates to a cold-atom interferometry sensor.

The operating principle of such a cold-atom interferometry sensor using stimulated Raman transitions is in particular described in the application U.S. Pat. No. 5,274,232. These cold-atom interferometry sensors are known to have great sensitivity. In such a sensor, it is necessary to obtain two laser beams with different frequencies propagating in different directions in order to obtain atomic interference fringes from the emission of a cooled-atom source.

To obtain these two laser beams necessary for Raman pulses, it is possible either to use two distinct laser sources, for example contrapropagative, or to use a single source generating a first dual-frequency laser beam and a reflector arranged to reflect the laser beam so as to generate a second dual-frequency laser beam. This second type of sensor using a single laser source and a reflector for generating the two Raman pulse laser beams has the advantage of having good performance since the relative aberrations between the two Raman beams are reduced. Such an interferometry sensor using a reflector for generating the second Ramon dual-frequency beam is for example described in the application FR-A-2848296.

To improve the stability of the measurement supplied by the interferometry sensor, it is necessary to reduce the dispersion of an atomic source in terms of speed by cooling the atoms so as to obtain cold atoms. To do this, use is made of capture means arranged to capture the atoms issuing from the atom source so as to obtain cold atoms.

The invention relates more particularly to such a cold-atom interferometry sensor comprising:

a source of atoms;

a dual-frequency laser able to generate a first Raman dual-frequency laser beam;

a reflector arranged to reflect the first Ramon dual-frequency laser beam so as to generate a second Ramon dual-frequency laser beam, the first laser beam and the second laser beam propagating in different directions in order to obtain atomic interference fringes from an emission of cold atoms obtained from the source of atoms.

Such a cold-atom interferometry sensor is for example described in the doctoral thesis entitled "Characterisation of a cold-atom inertial sensor" by Florence YVER LEDUC, 2004, or in the publication "Six-Axis Inertial Sensor Using Cold-Atom Interferometry", B. Canuel, F. Leduc, D. Holleville, A. Gauguet, J. Fils, A. Virdis, A. Clairon, N. Dimarcq, Ch. J. Borde, A. Landragin, and P. Bouyer, Phys. Rev. Lett. 97, 010402 (2006). In this document, and conventionally, the sensor comprises capture means arranged to capture the atoms issuing from the source of atoms so as to obtain cold atoms. As is also known, these capture means comprise a trap consisting of six lasers contrapropagating in the three directions in space. Such a cold-atom interferometry sensor therefore has the drawback of requiring at least one Raman laser for the atomic interference measurements, and several lasers for effecting the capture of atoms so as to obtain the cold atoms affording good interferometry measurement. As a result the cold-atom interferometry sensors of the prior art are complex and bulky.

The problem solved by the invention is providing one or more cold-atom interferometry sensors as described above requiring fewer lasers so as to be more compact, while enabling satisfactory measurements. According to the invention, this problem is solved by using the reflector no longer only for its function of generating the second Raman beam, but also for forming the capture means making it possible to obtain the cold atoms by means of multiple reflections of the first Raman beam on the surfaces of the reflector. More particularly, the problem mentioned above is solved by the fact that the reflector is also arranged to enable multiple reflections of the first beam on surfaces of the reflector so that the first beam and its multiple reflections make it possible to capture the atoms issuing from the atom source so as to obtain the cold atoms.

Thus, by virtue of the invention, the contrapropagating lasers forming, in the known devices, the capture means are no longer necessary since it is the first laser beam itself which, by means of multiple reflections on the reflector, provides the capture. Consequently the cold-atom interferometry sensor according to the invention requires only one laser source for performing both the interferometry measurements by Raman transition and the capture of the atoms in order to obtain cold atoms.

In the field of traps for obtaining cold atoms, the publication "Single-beam atom trap in a pyramidal and conical hollow mirror", de Lee et al. Optics Letters August 1996 is known, which teaches that it is possible to trap and cool atoms by means of a reflector using only one laser. However, this publication does not concern the field of cold-atom interferometry sensors and in particular it is nowhere mentioned that the reflector forming a particular atom trap described in the publication can be used as a reflector for reflecting the Raman beam of a cold-atom interferometry sensor. On the other hand, according to the invention, it is indeed the same reflector that is used to effect the capture of atoms and the reflection of the Raman laser beam.

Advantageous embodiments of the invention are now described. Advantageous features of the reflector mentioned above are first described. This reflector can be arranged so that the first beam and the reflections of the first beam on the surfaces of the reflector constitute contrapropagating beam pairs for capturing the atoms so as to obtain the cold atoms. In this case, the reflector can be arranged so that the first beam and the reflections of the first beam on the surfaces of the reflector constitute three pairs of contrapropagating beams. This feature makes it possible to make a satisfactory capture of the atoms issuing from the atom source so as to obtain the cold atoms.

The reflector may be a convex reflector so that the first beam and the reflections of the first beam on the reflector make it possible to capture the atoms in the volume of the reflector. This feature of the reflector enables the reflections of the first beam to be directed towards the inside of the reflector so as to ensure a good capture. The reflector can in particular have a conical or frustoconical shape so that the first beam and the reflections of the first beam on the reflector make it possible to capture the atoms in the volume formed by the reflector. In particular, the reflector can have a pyramidal shape with a square or truncated pyramidal cross section so that the first beam and the reflections of the first beam on the surfaces of the reflector constitute three pairs of contrapropagating beams to capture the atoms in the volume formed by the reflector. This particular shape of the reflector then ensures good capture.

The reflector can be arranged so that the second laser beam propagates in a direction opposite to the direction of propagation of the first beam and preferably the reflector can be arranged so that the second beam has an identical polarization to the polarization of the first beam. This facilitates the obtaining of atomic interference fringes. To do this, the reflector may have a frustoconical or truncated pyramidal shape with a flat surface perpendicular to the direction of the first beam, the flat surface being treated so that the beam reflected on the flat surface has a polarization identical to the polarization of the first beam.

Other advantageous features of the sensor according to the invention are now described. The atom source may comprise an atom chip provided on one of the flat surfaces of the reflector in order to create an ultra-cold cloud magnetically trapped. This feature of the atom source improves the trapping of the atoms and cooling thereof.

The sensor may also comprise magnetic means arranged to trap the cold atoms magneto-optically, the magnetic means being arranged with respect to the reflector so that the cold atoms are trapped in the volume of the reflector. The magnetic means can also be arranged to generate a constant magnetic field so as to emit the cold atoms in order to obtain the atomic interference fringes. The emission of the cold atoms in order to obtain the atomic interference fringes is for example able to be carried out by gravity.

The atom source may be able to generate an atom vapor by at least one of the following methods:
  desorption by heat,
  light,
  control of the temperature of a cold spot.

Such methods enable a satisfactory generation of atom vapour.

The sensor preferably comprises a vacuum chamber, the reflector being positioned in the vacuum chamber, and the sensor also comprising transmission means arranged to make the first laser beam enter the vacuum chamber. In this case, the transmission means may comprise a window transparent to the first laser beam.

The sensor may also comprise detection means arranged to detect the atomic interference fringes. These detection means comprise for example photodetection cells arranged to detect a resonance fluorescence emitted by the cold atoms.

The invention also relates to a system comprising a first interferometry sensor as described previously and a second interferometry sensor as described previously, the first sensor comprising a first Raman dualfrequency laser, the second sensor comprising a second Raman dual-frequency laser, the laser beam generated by the first laser of the first sensor having a propagation direction different from the propagation direction of the laser beam generated by the second laser of the second sensor, the system also comprising detection means positioned at the intersection of the propagation directions of the laser beam generated by the first laser and of the laser beam generated by the second laser.

This system may also comprise a third interferometry sensor as described previously, the third sensor comprising a third Raman dualfrequency laser, the laser beam generated by the third laser of the third sensor having a propagation direction different from the propagation direction of the laser beam generated by the second laser of the second sensor and from the direction of the laser beam generated by the second laser of the second sensor, the detection means being positioned at the intersection of the propagation directions of the beams generated by the first laser, the second laser and the third laser. In this way, it is possible to establish laser pulse sequences offering access to several inertial quantities successively, in particular in acceleration and in rotation.

BRIEF DESCRIPTION OF DRAWINGS

Detailed embodiments of the invention are now described with reference to the accompanying figures, in which.

DETAILED DESCRIPTION

In the figures, identical references relate, unless indicated to the contrary, to similar technical elements.

Figure 1:
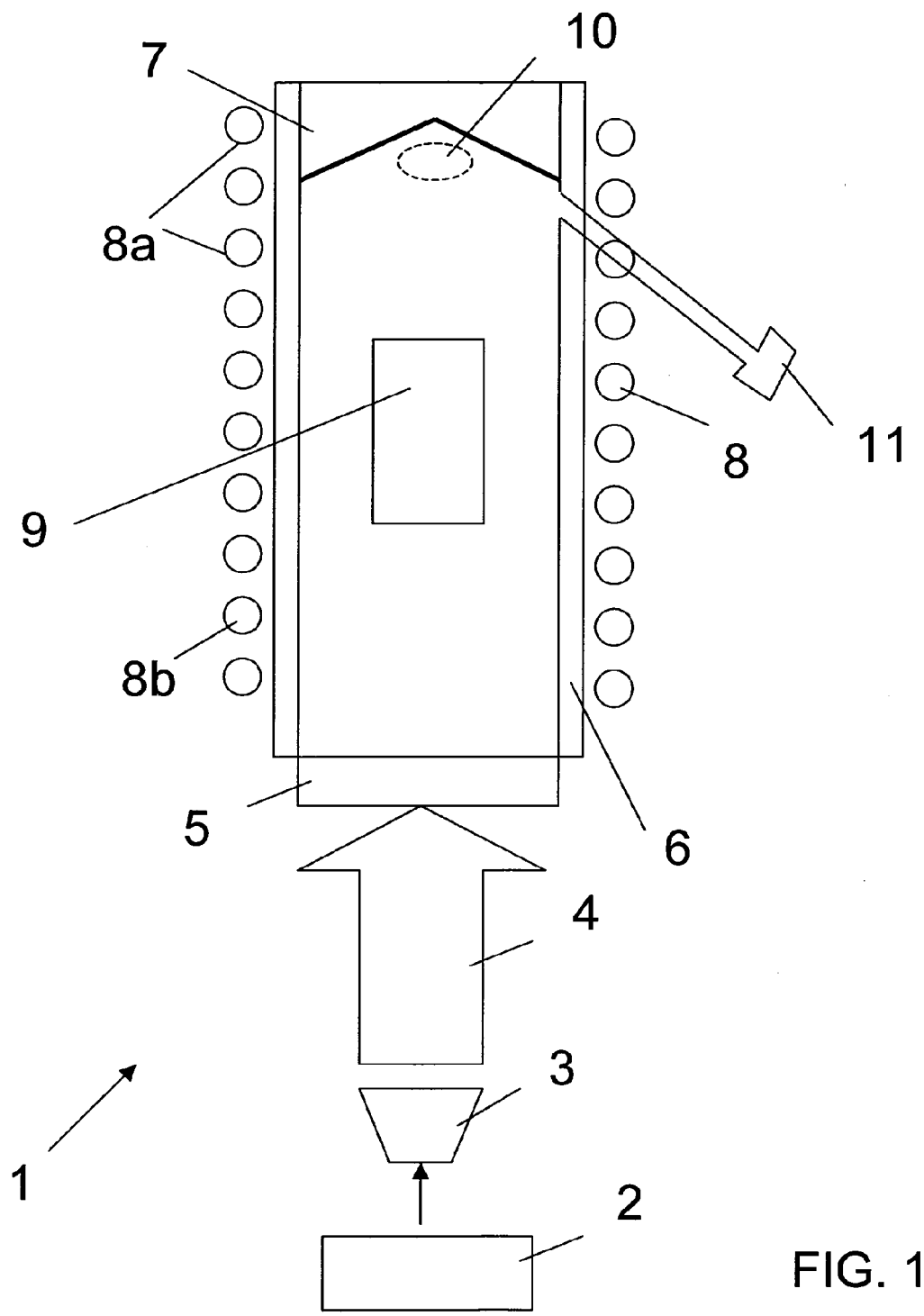
FIG. 1 shows a cross-section view of a cold-atom interferometry sensor according to a first embodiment of the invention.

As illustrated in FIG. 1, an interferometry sensor 1 according to the invention comprises an atom source 11, in the form of a solid reservoir heated and controlled for temperature or a dispenser. The atom source is arranged to make it possible to obtain an atom vapour in a vacuum chamber 6, either by desorption of heat by means of a dispenser, or by light with a technique of the LIAD type, or by controlling the temperature of a cold spot. The vacuum chamber 6 comprises a glass tube the cross section of which may be square or circular. The vacuum chamber 6 is closed at one end by a window 5 and at the other end by a convex reflector 7 that will be described in more detail below. The reflector 7 preferably has a pyramidal shape, the base of the pyramid measuring between one centimeter and five centimeters. In order to reduce the effect of vibration to which the sensor 1 may be subjected, the reflector 7 may optionally be fixed to a stabilization system comprising for example a low-level accelerometer for reading noise.

The interferometry sensor 1 also comprises a dual-frequency laser source 2 and a system 3 for shaping the laser signal generated by the source 2. The dual-frequency laser source 2 and the shaping system 3 are arranged with respect to each other in a known fashion so as to generate a first laser beam 4 entering through the window 5 with required size and polarization characteristics. In particular, the first laser beam may have a size lying between one centimeter and five centimeters so as to be adapted to the aforementioned pyramidal reflector 7. The two frequencies emitted by the dual-frequency laser 2 are spaced apart by the frequency of the hyperfine structure of the atom used in the sensor 1, for example 6800 MHz for rubidium 87.

The interferometry sensor 1 also comprises photodetection cells 9 placed in the vacuum chamber 6 so as to enable a resonance fluorescence to be collected for detecting an atomic signal. The vacuum chamber 6 is surrounded by a solenoid designated 8 overall. The solenoid 8 is excitable in parts. A first part 8a of the solenoid 8 composed of two coils creates a magnetic field gradient. This magnetic field gradient is able to allow magnetic trapping of the atoms in a capture zone 10 within the volume formed by the reflector 7. A second part 8b of the solenoid 8 completes the solenoid 8 in order to form a uniform magnetic field throughout the vacuum chamber 6.

The functioning of the interferometry sensor 1 according to the invention is now described. In operation, the interferometry sensor 1 according to the invention produces an atom trapping phase, an atom emission phase and an interferometry phase for interferometry measurements. The atom source 11 releases atoms in the top part of the vacuum chamber 6 at the reflector 7.

In the trapping phase, the dual-frequency laser beam 4 passes through the window 5 and enters the vacuum chamber 6. The dual-frequency laser beam 4 undergoes multiple reflections on the pyramidal reflector 7. For a pyramidal reflector 7, because of the multiple reflections on the surfaces of the reflector, the atoms are captured by the equivalent of six laser beams corresponding to three beams contrapropagative in the three directions in space, which cools the atoms released by the atom source. The atoms thus captured by the equivalent of six beams are also trapped by the gradient magnetic field generated by the part 8a of the solenoid 8. Consequently, according to the invention, the reflector 7 itself allows capture and trapping of the atoms so as to generate cold atoms that can be used in a subsequent launch phase. In the trapping phase, the laser beam 4 has for example an energy flux of 2 mw/cm2, that is to say a power of 1 to 25 mW according to the configurations of the pyramidal reflector 7.

The laser beam 4 is dual frequency with two frequencies slaved precisely to coincide with an atomic line. The two frequencies may be mixed with the same polarisation or orthogonal polarisations and are separated by a value close to the difference in frequency of the hyperfine structure of the atom in question. The magnetic field gradient generated by the part 8a of the solenoid 8 is between 10 and 20 gausslcm in trapping phase.

In emission phase, the laser source may be switched off or on in order to assist the launch. In a vertical configuration as illustrated in FIG. 1, gravity fulfils the role of emission force when the laser source is switched off. In other configurations, the constant magnetic field generated by the part 8b of the solenoid 8 produces an emission force while keeping the laser source 2 switched on. In this case, the constant magnetic field maybe around I gauss.

Once the atoms are emitted in the emission phase, the interferometry sensor according to the invention performs interferometry measurements in an interferometry phase. In this phase, the adjustment of the laser is different from the adjustment in the emission phase. The size of the laser beam 4 is greater than the size of the atom sample and the energy flux of the laser is around 100 mwlcm2. The two frequencies of the Raman dual-frequency laser beam 4 are mixed with polarisations for example orthogonal and are separated by a value close to the frequency difference of the hyperfine structure of the atom in question. Non-orthogonal polarisations may however be used, in particular in gravity measurement mode. The two frequencies are slaved in phase, that is to say the relative frequency error is such that the phase error caused during the measurement time is less than one radian.

The magnetic field gradient generated is zero so as to no longer trap the atoms in the capture zone 10 at the reflector 7, and the constant magnetic field generated by the part 8b of the solenoid 8 is around 100 mGauss on the path of the atoms. In a manner known per se in the field of atomic interferometry, a first Raman dual-frequency laser beam and a second Raman dual-frequency laser beam propagating in different directions make it possible to obtain atomic interference fringes from the emission of the cold atoms. This principle of atomic interferometry is for example described in the application U.S. Pat. No. 5,274,232, in the aforementioned thesis "Characterisation of a cold-atom inertial sensor" by Florence YVER LEDUC, 2004, in the application FR-A-2848296 or in the aforementioned reference publication "Six-Axis Inertial Sensor Using Cold-Atom Interferometry".

In general terms, according to the invention, the Raman dualfrequency laser beam 4 is retro-reflected on the reflector 7 so as to obtain a second Raman dual-frequency laser beam propagating in an opposite direction. Interference fringes are then obtained in the interferometry phase by virtue of the interferometry sensor 1 according to the invention. The photodetection cells 9 make it possible to collect the resonance fluorescence of the atoms used for detecting the atomic signal.

Consequently, according to the invention, the pyramidal shape of the reflector 7 makes it possible firstly to capture atoms during the trapping phase and atom cooling phase by virtue of the multiple reflections on the surface of the reflector, and secondly makes it possible to reflect a Raman dual-frequency laser beam 4 in order to generate the second Raman dual-frequency laser beam used during the interferometry phase in a retro-reflected configuration. The use of the same reflector for fulfilling these two functions of an interferometry sensor then has the advantage of improving the compactness of the interferometry sensor. The principle of the detection of the atoms is described below in more detail.

When atoms are detected, after interrogation, the first frequency of the laser beam is tuned to the cycling transition, for example F=2 to F=3 for rubidium 87, in order to detect by fluorescence the atoms in the F=2 state. If standardization of the atomic signal is necessary, use of the second frequency of the laser beam, tuned in order to repump the atoms, makes it possible to detect the atoms initially in F=1, and which are therefore repumped in F=2 for detection. Two methods may be used.

The first consists of spatially separating the two clouds F=1 and F=2. In this case, a first laser pulse stops the atoms in F=2, leaving the atoms in F=1 to continue their fall. When the two clouds are spatially separate, a second laser pulse with the repumping laser makes it possible to detect simultaneously the fluorescence of the two clouds by imaging them on two different detectors.

The second method is a detection by means of the same detector, but separated in time. In this case, a first pulse makes it possible to detect the fluorescence of the atoms in F=+2 and then, by adding the repumping laser, it is possible to measure the sum of the fluorescence in the two levels. The height of the detection zone can then be reduced to 10 millimeters.

Figure 2:
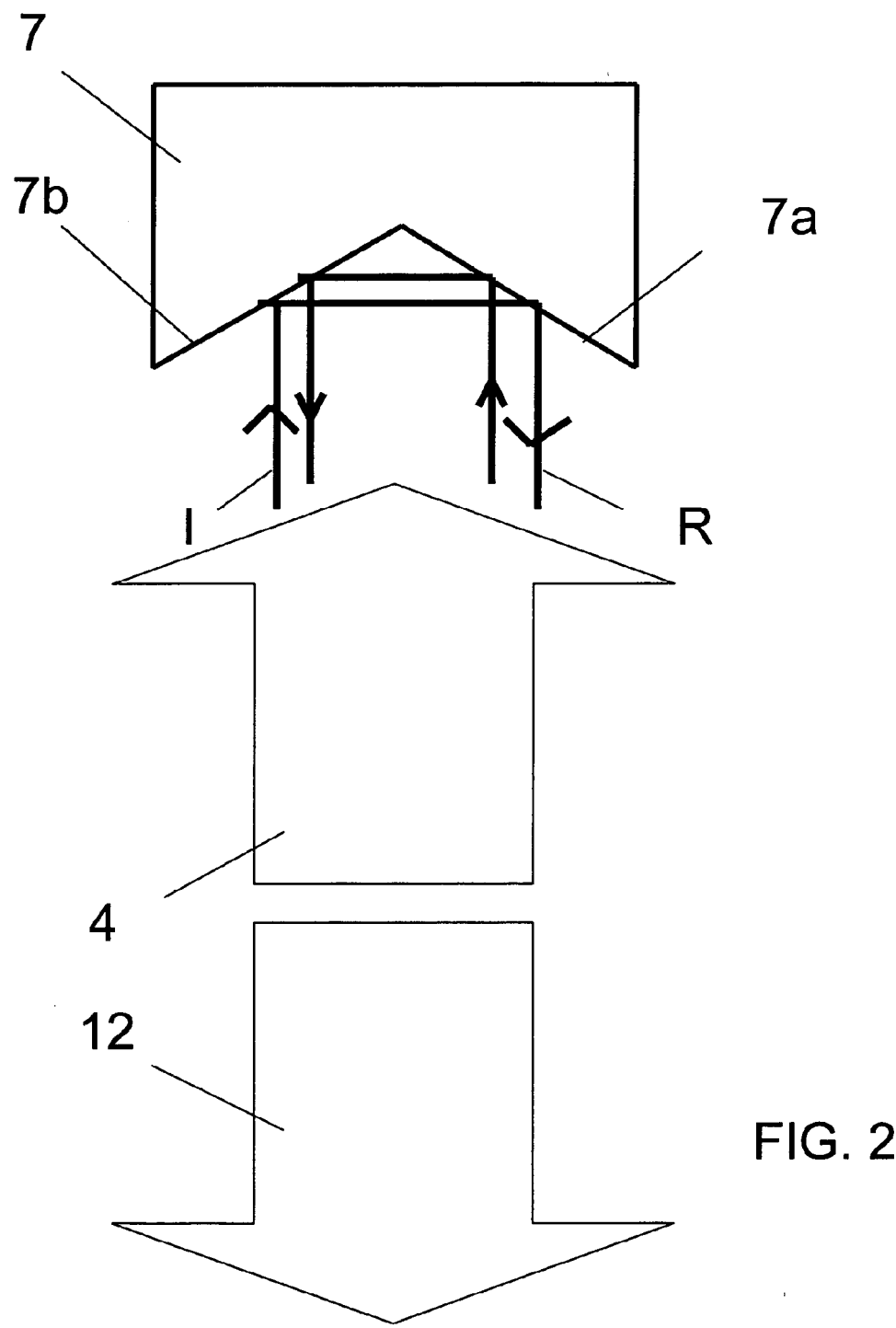
FIG. 2 is a detailed cross-section in section of a reflector arranged to reflect a Raman beam in a sensor according to the invention.
Figure 3:
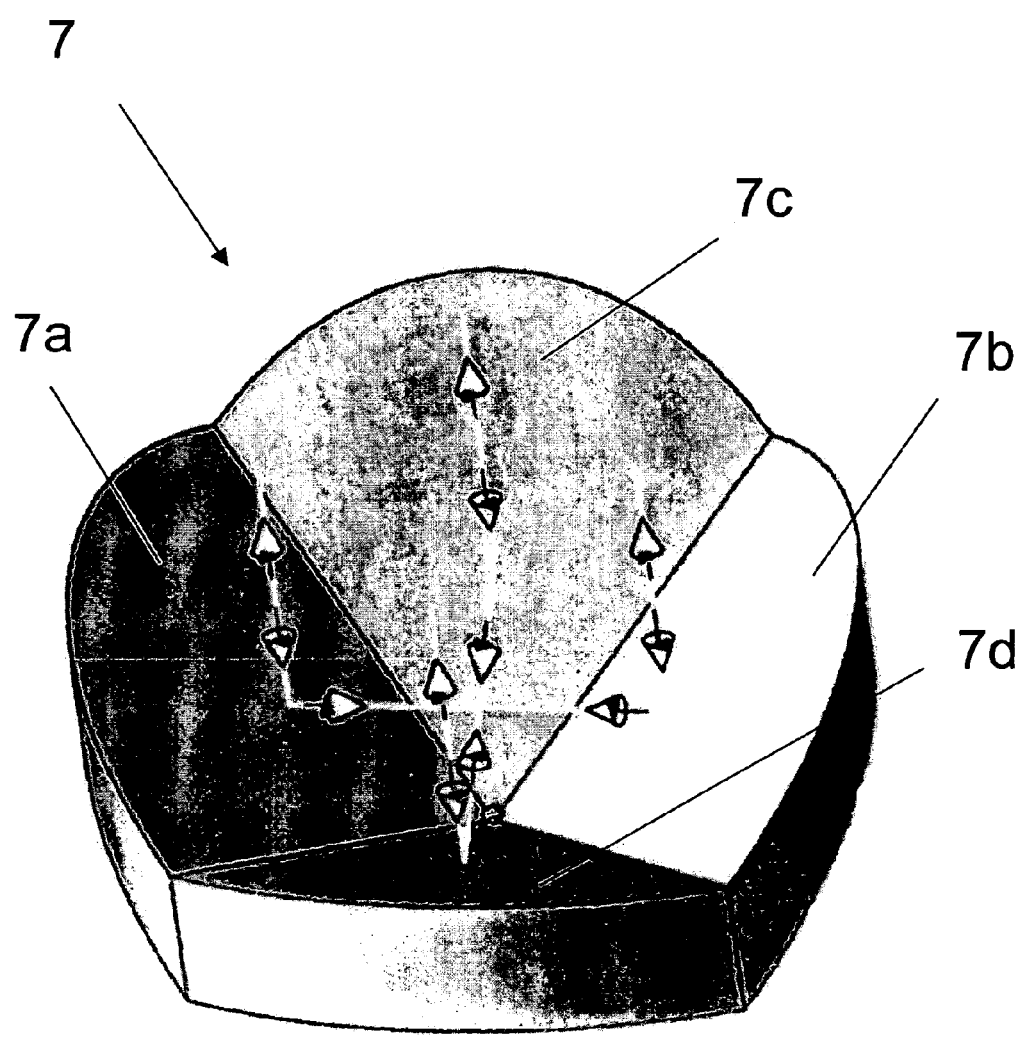
FIG. 3 is a perspective view of a reflector arranged to reflect a Raman beam in a sensor according to the invention.

With reference to FIG. 2 and FIG. 3, a description is given in more detail of the principle of the multiple reflections at the reflector 7 making it possible both to capture the atoms and to generate a retro-reflected Raman beam in order to perform interferometry measurements. In FIG. 2, the pyramidal reflector 7 is illustrated in section. Such a pyramidal reflector 7 is for example a cube wedge. Geometrically, it can be considered that, when the laser beam designated overall by the reference 4 arrives on the reflector 7, an incident beam I is reflected for the first time on the face 7b, and a second time on the opposite face 7a, so that the reflected beam R at the exit from the reflector 7 has a direction opposite to the incident beam. The reflected beam R also has a polarization identical to that of the incident beam I. Thus, if the incident beam I is polarized in a right circular fashion, the reflected beam R is polarized in a right circular fashion, but is propagated in an opposite direction. In this way, the reflected beam, referenced 12 overall, has a polarization identical to that of the incident beam 4, which makes it possible to obtain atomic interference fringes in an interferometry sensor.

FIG. 3 is a perspective view of the reflector 7 on which the opposite faces 7a and 7b of FIG. 2 are illustrated, and two other opposite faces 7c and 7d. In this FIG. 3, it will be understood that the multiple reflections of the laser beam 4 make it possible firstly to obtain a retro-reflected Raman beam 12, but also to capture the atoms in the volume formed by the pyramidal reflector 7. This is because the multiple reflections generate contrapropagative beams that ensure such capture.

Figure 4:
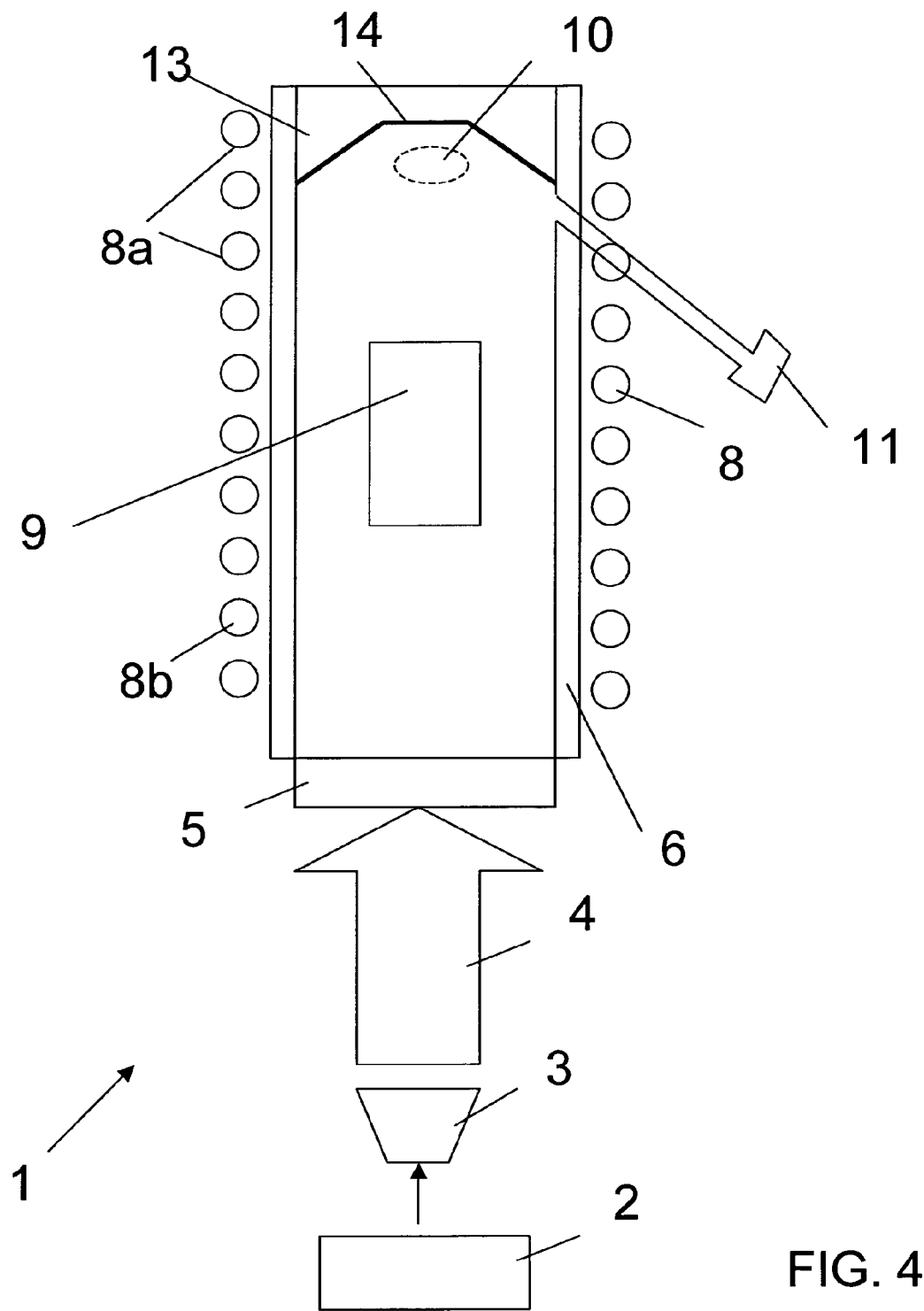
FIG. 4 shows a cross-section view of a cold-atom interferometry sensor according to an embodiment of the invention.

Variants of the interferometry sensor according to the invention are now described. Illustrated in FIG. 4, an interferometry sensor 1 according to one embodiment of the invention comprises all the technical elements described with reference to FIG. 1 with a structurally different reflector 7. In FIG. 4, the interferometry sensor 1 comprises a reflector 13 having a pyramid shape truncated in its top part. The top part 14 of the reflector is therefore flat at the centre of the reflector whereas the lateral walls of the reflector are inclined with respect to this central part 14.

Figure 5:
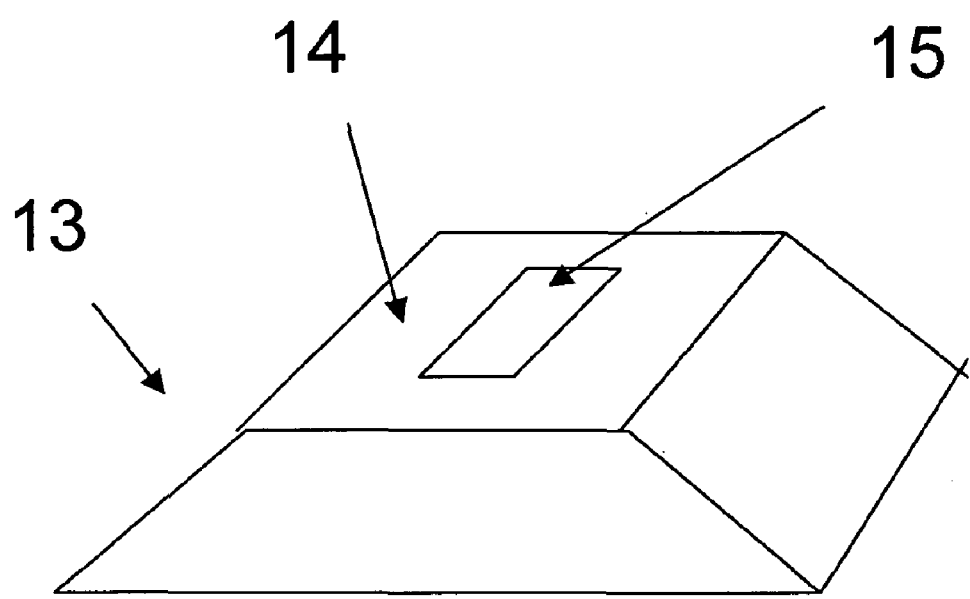
FIG. 5 shows a reflector in the form of a truncated pyramid provided with an atom chip used in an embodiment of a cold-atom interferometry sensor according to an embodiment of the invention.

In this embodiment, the reflective top part 14 is treated for example with one lambda blade out of four or a metallic treatment so as to allow a turning of polarization when the Raman beam is reflected on this part. As with the reflector 7 described with reference to FIGS. 1, 2 and 3, the reflector 13 fulfils a function of capture of the atoms for cooling thereof and a function of reflection of the first Raman beam in order to generate the second Raman beam necessary for the interferometry measurements. As illustrated in FIG. 5, in this embodiment, it is possible to position an atom chip 15 on one or more of the flat parts of the reflector in the form of a truncated pyramid 13 such as for example the top part 14. Such an atom chip is arranged to trap the atoms and to create a Bose Einstein condensate.

Figure 6:
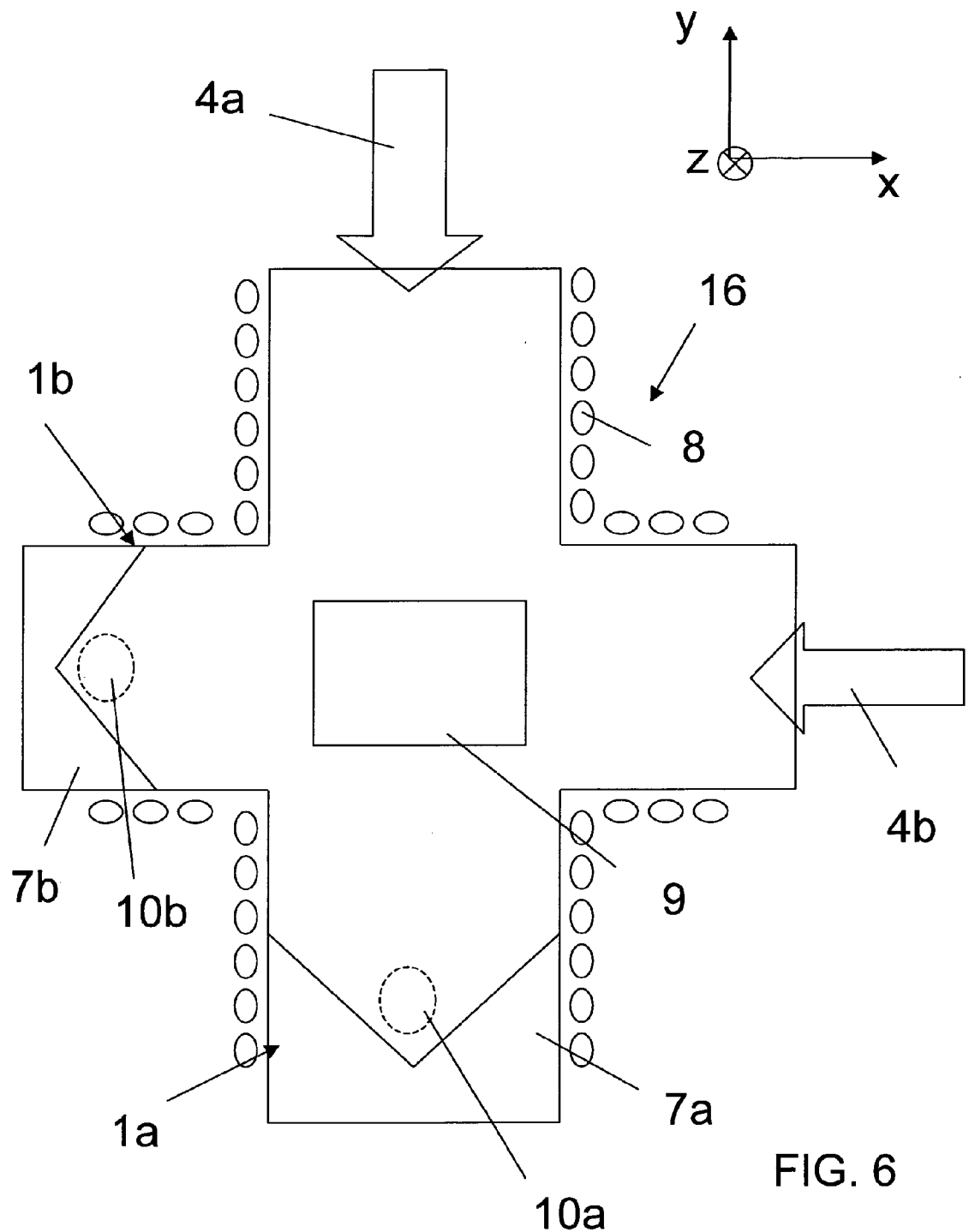
FIG. 6 shows a multi-axis system comprising two orthogonal coupled interferometry sensors according to the invention.

Embodiments of a multi-axis system comprising an interferometry sensor as previously described is now described with reference to FIG. 6. Illustrated in FIG. 6, a system 16 according to an embodiment of the invention comprises two interferometry sensors 1a and 1b arranged orthogonally and coupled. The interferometry sensors may be as described with reference to FIG. 1, but also as described with reference to FIG. 4 with a reflector truncated in its top part. In this way, it is possible to establish laser pulse sequences offering access to several inertial quantities successively, in particular in acceleration and rotation.

The system 16 according the invention comprises an interferometry sensor 1a coupled to an interferometry sensor 1b, the two sensors preferably being arranged orthogonally. The interferometry sensor 1a comprises a reflector 7a able to reflect, by multiple reflections, a Raman beam 4a so as to trap atoms in a trap 10a and generate a second Raman beam in order to make the interferometry measurements. In the same way, the interferometry sensor 1b comprises a reflector 7b able to reflect, by multiple reflections, a Raman beam 4b so as to trap atoms in a trap 10b and generate a second Raman beam to make the interferometry measurements. The interferometry measurements are made by virtue of detection means 9 positioned at the intersection of the paths of the laser beams 4a and 4b. The system 1 is surrounded by coils 8 arranged to generate a magnetic field having a gradient part for trapping the atoms at the capture zones 10a and 10b, and a constant part.

In operation, the measurements by means of the laser 4a and cold atoms issuing from the capture zone 10a afford access to the acceleration in the direction x of the interferometer 1a and the measurements by means of the laser 4b and the cold atoms issuing from the capture zone 10b afford access to the acceleration in the direction y of the interferometer 1b. In addition, the measurements by means of the laser 4a and the cold atoms issuing from the capture zone 10b afford access to the speed of rotation along the axis z. In the same way, the measurements by means of the laser 4b and the cold atoms issuing from the captive zone 10a afford access to the speed of rotation along the axis z.

In another embodiment, it also possible to produce an interferometry system by means of three sensors as previously described mounted perpendicular in the three directions in space. In this case, an inertial base measuring six inertial quantities corresponding to three rotations and three accelerations is produced.

The interferometry sensors described previously may be used to form matter-wave gravimeters, accelerometers or gyrometers. The devices thus obtained have the advantage of being compact because of the saving on several reflectors and/or several laser sources.

What is claimed is:

1. A cold-atom interferometry sensor comprising:
   a source of atoms;
   a dual-frequency laser able to generate a first Raman dual-frequency laser beam; and
   a reflector arranged to reflect the first Raman dual-frequency laser beam so as to generate a second Raman dual-frequency laser bean, the first laser beam and the second laser beam propagating in different directions in order to obtain atomic interference fringes from an emission of cold atoms obtained from the source of atoms;
   the reflector is also arranged to enable multiple reflections of the first beam on surfaces of the reflector so that the first beam and the multiple reflections thereof make it possible to capture the atoms issuing from the atom source so as to obtain the cold atoms.

2. The cold-atom interferometry sensor according to claim 1, wherein the reflector is arranged so that the first beam and the reflections of the first beam on the surfaces of the reflector constitute pairs of contrapropagating beams for capturing the atoms so as to obtain the cold atoms.

3. The cold-atom interferometry sensor according to claim 2, wherein the reflector is arranged so that the first beam and the reflections of the first beam on the surfaces of the reflector constitute three pairs of contrapropagating beams.

4. The cold-atom interferometry sensor according to claim 1, wherein the reflector is a convex reflector so that the first beam and the reflections of the first beam on the reflector make it possible to capture the atoms in the volume of the reflector.

5. The cold-atom interferometry sensor according to claim 1, wherein the reflector has a conical or frustoconical shape so that the first beam and the reflections of the first beam on the reflector make it possible to capture the atoms in the volume formed by the reflector.

6. The cold-atom interferometry sensor according to claim 5, wherein the reflector has a pyramidal shape with a square or truncated pyramidal cross section so that the first beam and the reflections of the first beam on the surfaces of the reflector constitute three pairs of contrapropagating beams for capturing the atoms in the volume formed by the reflector.

7. The cold-atom interferometry sensor according to claim 1, wherein the sensor also comprises magnetic means arranged to trap the cold atoms magneto-optically, the magnetic means being arranged with respect to the reflector so that the cold atoms are trapped in the volume of the reflector.

8. The cold-atom interferometry sensor according to claim 7, wherein the magnetic means are also arranged to generate a constant magnetic field so as to effect the emission of the cold atoms in order to obtain the atomic interference fringes.

9. The cold-atom interferometry sensor according to claim 1, wherein the emission of the cold atoms to obtain the atomic interference fringes is able to be achieved by gravity.

10. The cold-atom interferometry sensor according to claim 1, wherein the atom source is able to generate an atom vapor by at least one of the following methods:
   desorption by heat;
   light; and
   control of the temperature of a cold spot.

11. The cold-atom interferometry sensor according to claim 1, also comprising a vacuum chamber the reflector being positioned in the vacuum chamber, and the sensor also comprises transmission means arranged to make the first laser beam enter the vacuum chamber.

12. The cold-atom interferometry sensor according to claim 11, wherein the transmission means comprise a window transparent to the first laser beam.

13. The cold-atom interferometry sensor according to claim 1, also comprising a detector arranged to detect the atomic interference fringes.

14. The cold-atom Interferometry sensor according to claim 13, wherein the detector further comprises comprise photodetection cells arranged to detect a resonance fluorescence emitted by the cold atoms.

15. An interferometry sensor comprising:
   a source of atoms;
   a dual-frequency laser able to generate a first Raman dual-frequency laser beam;
   a reflector arranged to reflect the first Raman dual-frequency laser beam so as to generate a second Raman dual-frequency laser beam, the first laser beam and the second laser beam propagating in different directions in order to obtain atomic interference fringes from an emission of atoms obtained from the source of atoms;
   the reflector being also arranged to enable multiple reflections of the first beam on surfaces of the reflector so that the first beam and the multiple reflections thereof make it possible to capture the atoms issuing from the atom source so as to obtain the atoms; and
   wherein the reflector is arranged so that the second laser beam propagates in a direction opposite to the direction of propagation of the first beam.

16. The interferometry sensor according to claim 15, wherein the reflector is arranged so that a second beam has a polarization identical to the polarization of the first beam.

17. The interferometry sensor according to claim 16, wherein the reflector has a frustoconical or truncated pyramidal shape with a flat surface perpendicular to the direction of the first beam, the flat surface being treated so that the beam reflected on the flat surface has polarization identical to the polarization of the first beam.

18. The interferometry sensor according to claim 17, wherein the atom source comprises an atom chip provided on one of the flat surfaces of the reflector in order to create a magnetically trapped ultra-cold cloud.

19. A system comprising:
   a first interferometry sensor, and a second interferometry sensor, the first sensor comprising a Raman dual-frequency laser, the second sensor comprising a second Raman dual-frequency laser; and
   a laser beam generated by the first laser of the first sensor having a propagation direction different from the propagation direction of a laser beam generated by the second laser of the second sensor;
   detection means positioned at an intersection of the propagation directions of the laser beam generated by the first laser and of the laser beam generated by the second laser.

20. The system according to claim 19, also comprising a third interferometry sensor further comprising a third Raman dual-frequency laser, the laser beam generated by the third laser of the third sensor having a propagation direction different from the propagation direction of the laser beam generated by the second laser of the second sensor and the direction of the laser beam generated by the second laser of the second sensor, the detection means being positioned at the intersection of the propagation directions of the beams generated by the first laser, the second laser and the third laser.

* * * * *